US010255040B2

(12) United States Patent
    Streit

(10) Patent No.: US 10,255,040 B2
(45) Date of Patent: Apr. 9, 2019

(54) SYSTEM AND METHOD FOR BIOMETRIC IDENTIFICATION

(71) Applicant: VERIDIUM IP LIMITED, London (GB)

(72) Inventor: Scott Streit, Woodbine, MD (US)

(73) Assignee: VERIDIUM IP LIMITED, London (GB)

( * ) Notice: Subject to any disclaimer, the term of this patent is extended or adjusted under 35 U.S.C. 154(b) by 0 days.

(21) Appl. No.: 15/592,542

(22) Filed: May 11, 2017

(65) Prior Publication Data

US 2018/0330179 A1    Nov. 15, 2018

(51) Int. Cl.
  *G06K 9/00*  (2006.01)
  *G06F 7/483*  (2006.01)
  *G06N 3/04*  (2006.01)
  *G06K 9/46*  (2006.01)
  *G06K 9/62*  (2006.01)
  *G06F 21/32*  (2013.01)

(52) U.S. Cl.
  CPC ......... *G06F 7/483* (2013.01); *G06K 9/00288* (2013.01); *G06K 9/4628* (2013.01); *G06K 9/6273* (2013.01); *G06N 3/04* (2013.01); *G06F 21/32* (2013.01)

(58) Field of Classification Search
  CPC ........... G06K 9/00885; G06K 9/00154; G06K 9/00335; G06K 9/00362; G06K 9/00597
  See application file for complete search history.

(56) References Cited

U.S. PATENT DOCUMENTS

| 5,161,204 | A | 11/1992 | Hutcheson et al. |
| 8,369,595 | B1 | 2/2013 | Derakhshani et al. |
| 9,838,388 | B2* | 12/2017 | Mather ............... H04L 63/0861 |
| 2007/0266427 | A1* | 11/2007 | Kevenaar ........... G06K 9/00087 726/5 |
| 2008/0298642 | A1* | 12/2008 | Meenen .................... G06K 9/00 382/115 |
| 2009/0074259 | A1 | 3/2009 | Baltatu et al. |
| 2012/0314974 | A1* | 12/2012 | Yang .................... G06K 9/6211 382/294 |
| 2013/0343616 | A1* | 12/2013 | Forero ............... G06K 9/00335 382/115 |
| 2014/0068722 | A1 | 3/2014 | Hayat |
| 2015/0278642 | A1 | 10/2015 | Chertok et al. |
| 2015/0356704 | A1* | 12/2015 | Lipman ................. G06T 3/0093 703/1 |
| 2016/0373440 | A1 | 12/2016 | Mather et al. |
| 2017/0076145 | A1* | 3/2017 | Gottemukkula .... G06K 9/00288 |
| 2017/0104752 | A1* | 4/2017 | Sakemi ................... H04L 9/008 |
| 2017/0124263 | A1* | 5/2017 | Crafts, Jr. ............. G16H 40/20 |
| 2017/0140207 | A1 | 5/2017 | Zhu et al. |

(Continued)

OTHER PUBLICATIONS

Akotkar, Atul Sureshpant et al, "Secure of Face Authentication Using Visual Cryptography." International Journal of Innovative Science and Modern Engineering, vol. 2, Issue 5, Apr. 2014.

(Continued)

*Primary Examiner* — Bobbak Safaipour
(74) *Attorney, Agent, or Firm* — Leason Ellis LLP

(57) ABSTRACT

Computer implemented systems and methods for matching an encrypted biometric input record with at least one stored encrypted biometric record, and without data decryption of the input and the at least one stored record.

20 Claims, 8 Drawing Sheets

(56) References Cited

U.S. PATENT DOCUMENTS

| | | | |
|---|---|---|---|
| 2017/0351909 A1* | 12/2017 | Kaehler | G06K 9/00281 |
| 2018/0165545 A1* | 6/2018 | Matsunami | G06K 9/00093 |
| 2018/0176216 A1* | 6/2018 | Mather | H04L 63/0861 |

OTHER PUBLICATIONS

The Directive 95/46/EC of the European Parliament and of the Council, EU Directive 95/46/EC, Nov. 23, 1995.
Open Web Application Security Project (OWASP), "OWASP Top 10 vulnerabilities", Apr. 20, 2015.
Bonneau, J., C. Herley, P. C. van Oorschot, and F. Stajano, "The quest to replace passwords: A framework for comparative evaluation of Web authentication schemes," Proceedings 2012 IEEE Symposium on Security and Privacy, S&P 2012, San Francisco, CA, pp. 553-567, May 2012.
Chan, S. W., and R. Mordani, Java™ Servlet Specification, Version 3.1. Redwood Shores, CA: Oracle America, Inc., Apr. 2013.
Handley, M., JAX-RS: Java™ API for RESTful Web Services, Version 1.0. Santa Clara: CA: Sun Microsystems, Inc., Sep. 2008.
Nahamoo, D., "IBM Research," IBM 5 in 5: Biometric data will be the key to personal security, Dec. 19, 2011.
PayPal Stories, "PayPal and the National Cyber Security Alliance Unveil Results of New Mobile Security Survey," 2015. Oct. 9, 2013.
Slideshare.net, "The 10 Hot Consumer Trends of 2014 Report," Dec. 11, 2013.
U.S. Department of Defense, DoD 5200.28-STD, "Department of Defense Trusted Computer System Evaluation Criteria," Dec. 26, 1985.
Institute for Electrical and Electronics Engineers (IEEE), IEEE 1619 Standard for Cryptographic Protection of Data on Block-Oriented Storage, May 2007.
Open Web Application Security Project (OWASP), The Cryptographic Storage Cheat Sheet, 2016. Last revision Mar. 5, 2017.
National Institute of Standards and Technology (NIST), NIST Special Publication 800-122, Apr. 2010.
The International Organization for Standardization (ISO) and the International Electrotechnical Commission (IEC), ISO/IEC 27001, "Information technology—Security techniques—Information security management systems—Requirements", Second edition, Nov. 2013.
The Directive 95/46/EC of the European Parliament and of the Council, EU Directive 95/46/EC, Oct. 24, 1995.
European Banking Authority (EBA) Discussion Paper on future Draft Regulatory Technical Standards on strong customer authentication and secure communication under the revised Payment Services Directive (PSD2), (EBA/PSD2), Dec. 8, 2015.
The U.S. Department of Commerce, EU-U.S. Privacy Shield Framework Principles Issued by The U.S. Department of Commerce, Feb. 2013.
104th Congress, Public Law 104-191, The Health Insurance Portability and Accountability Act of 1996 (HIPAA), Aug. 21, 1996.
National Institute of Standards and Technology (NIST), NIST Special Publication 800-53 Revision 4 Security and Privacy Controls for Federal Information Systems and Organizations, Apr. 2013.
IEEE-SA Standards Board, "P2410-D1 Draft Standard for Biometric Open Protocol," IEEE Aug. 2016 (Dec. 2016).
IEEE-SA Standards Board, "P2410™/D11 Draft Biometric Open Protocol Standard" IEEE Sep. 2015 (Feb. 2015).
Ross, Arun, Othman, Asem, IEEE Transactions on Information Forensics and Security, vol. 6, Issue 1, Mar. 2011, Visual Cryptography for Privacy.
Bringer, Julien, Chabanne, Herve, Kindarji, Bruno, "Identification with Encrypted Biometric Data", https://arxiv.org/abs/0901.1062, Sep. 7, 2009.
Wikipedia, "Convolutional Neural Network" <https://en.wikipedia.org/wiki/Convolutional_neural_network> Last edited May 3, 2017.
Nielsen, Michael A. "Neural Networks and Deep Learning." Neural Networks and Deep Learning. Determination Press, Jan. 1, 1970. Web. <http://neuralnetworksanddeeplearning.com/chap4.html>.
Trewin, Shari, "Biometric Authentication on a Mobile Device: A Study of User Effort, Error and Task Disruption," ACSAC. Dec. 3-7, 2012.
Akotkar, Atul Sureshpant et al, "Secure of Face Authentication Using Visual." International Journal of Innovative Science and Modern Engineering, vol. 2, Issue 5, Apr. 2014.
Weiss, Martin A. et al., "U.S.-EU Data Privacy: From Safe Harbor to Privacy Shield", Congressional Research Service, May 19, 2016.
Aeri et al. "Vein Patterns as Bio-Metric Identifier using Euclidean Distance" In: International Journal of Computer Applications (0975-8887) vol. 89, No. 20, Mar. 2014 [online] 20-22, 24 [retrieved on Jul. 5, 2018 (Jul. 5, 2018)] Retrieved from the Internet <URL: https://pdfs.semanticscholar.org/2914/a4e0ca6ae9709ca512f2e3e2802f057d23dd.pdf>, entire document, especially Abstract; pp. 1-3.
Gilad-Bachrach, Ran et al., "CryptoNets: Applying Neural Networks to Encrypted Data with High Throughput and Accuracy", Proceedings of the 33rd International Conference on Machine Learning, vol. 48, Feb. 24, 2016.
Cheon, Jung Hee et al., "Ghostshell: Secure Biometric Authentication using Integrity-based Homomorphic Evaluations", May 19, 2016.
Patsakis, Constantinos et al., "Privacy-Preserving Biometric Authentication and Matching via Lattice-Based Encryption", Jan. 2016.

* cited by examiner

FIG. 4A

"fc7-conv"
Activation

Data shape: [256 1 1]
Mean: 2.09114
Std deviation: 2.89049

"softmax"
Activation

Data shape: [15 1 1]
Mean: 0.0666667
Std deviation: 0.249444

Totals          Total learned parameters:

SYSTEM AND METHOD FOR BIOMETRIC IDENTIFICATION

FIELD OF THE INVENTION

The present invention relates, generally, to systems and methods for acquiring and characterizing biometric features and, in particular, to systems and methods for acquiring and characterizing biometric features for the purposes of identifying or authenticating a user.

BACKGROUND OF THE INVENTION

Information of all kinds continues to be stored and accessed remotely, such as on storage devices that are accessible over data communication networks. For example, many people and companies store and access financial information, health and medical information, goods and services information, purchasing information, entertainment information, multi-media information over the Internet or other communication network. In addition to accessing information, users can effect monetary transfers (e.g., purchases, transfers, sales or the like). In a typical scenario, a user registers for access to information, and thereafter submits a user name and password to "log in" and access the information. Securing access to (and from) such information and data that is stored on a data/communication network remains a paramount concern.

Convenience drives consumers toward biometrics-based access management solutions. It is believed that a majority of users of smartphones would prefer to use fingerprints instead of a password, with many preferring eye recognition in place of fingerprint recognition. Biometrics are increasingly becoming a preferred and convenient method for identity detection and verification, and for authentication.

Transport-level encryption technology provides relatively strong protection of transmission of various types of data, including biometric data, and supports confidentiality, assurance, and non-repudiation requirements. Standards, such as IEEE 2410-2016, provide for protection from an adversary listening in on communication, and provide detailed mechanisms to authenticate based on a pre-enrolled device and a previous identity, including by storing a biometric in encrypted form. This is considered to be a one-to-one case and includes steps for sending and receiving encrypted biometric data, as compared to an existing encrypted biometric sample. Accordingly, such one-to-one case is considered to be an authentication use case, as a given biometric vector and an identity can be used as input and authentication can occur when the biometric vector matches an existing biometric vector corresponding to respective identity.

SUMMARY

In one or more implementations, the present application provides for computer implemented systems and methods for matching an encrypted biometric input record with at least one stored encrypted biometric record, and without data decryption of the input and the at least one stored record. An initial biometric vector is provided to a neural network, and the neural network translates the initial biometric vector to a Euclidian measurable feature vector. The Euclidian measurable feature vector is stored in a storage with other Euclidian measurable feature vectors. Moreover, a current biometric vector representing the encrypted biometric input record is received from a mobile computing device over a data communication network, and the current biometric vector is provided to the neural network. The neural network translates the current biometric vector to a current Euclidian measurable feature vector. Furthermore, a search of at least some of the stored Euclidian measurable feature vectors is performed in a portion of the data storage using the current Euclidian measurable feature vector. The encrypted biometric input record is matched with at least one encrypted biometric record in encrypted space as a function of an absolute distance computed between the current Euclidian measurable feature vector and a calculation of each of the respective Euclidian measurable feature vectors in the portion of the storage.

In one or more implementations, the present application further provides for classifying the Euclidian measurable feature vector and/or classifying the current Euclidian measurable feature vector, wherein the classifying is performed at least in part using one or more distance functions.

In one or more implementations, classifying the Euclidian measurable feature and/or the current Euclidian measurable feature vector returns floating point values, and a Frobenius algorithm is utilized to compute an absolute distance between each floating point and its average.

In one or more implementations, the search is conducted in Order log(n) time. using a Frobenius algorithm to classify the Euclidian measurable biometric vectors traversing a hierarchy of the classified Euclidian measurable biometric vectors in Order log(n) time; and identifying that a respective Euclidian measurable biometric vector is the current Euclidian measurable feature vector.

In one or more implementations, the present application provides for identifying, for each respective Euclidian measurable biometric vector, a plurality of floating point values, and using a bitmap to eliminate from an absolute distances calculation any of the plurality of values that are not present in every vector.

In one or more implementations, the present application provides for identifying, for each respective Euclidian measurable biometric vector, a plurality of floating point values, and using a bitmap to eliminate from an absolute distances calculation any of the plurality of values that are not present in every vector.

In one or more implementations, the present application provides for identifying, for each respective Euclidian measurable biometric vector, a plurality of floating point values; and defining a sliding scale of importance based on the number of vectors a respective one of the floating point value appears.

In one or more implementations, the neural network is configured with a variety of convolutional layers, together with a rectifier (ReLU) and pooling nodes.

In one or more implementations, the neural network is configured to use pooling as a form of non-linear downsampling, and further wherein one or more pooling nodes progressively reduce the spatial size of a represented Euclidean-measurable feature vector to reduce the amount of parameters and computation in the neural network.

In one or more implementations, the present application provides for identifying computing, for each of a plurality of stored Euclidian measurable feature vectors, a relative position difference between an average face vector and the respective Euclidian measurable feature vector, for squaring the relative position difference, for summing the values, and for calculating the square root.

In one or more implementations, performance of the neural network is determined as a function of a cost function, in which a number of layers given as a spatial size of an output volume is computed as a function of an input volume size W, a kernel field size of layer neurons K, a stride with which the layers are applied S, and an amount of zero padding P used on a border.

These and other aspects, features, and advantages can be appreciated from the accompanying description of certain embodiments of the invention, the accompanying drawing figures and claims.

DESCRIPTION OF THE DRAWING FIGURES

FIGS. 4A and 4B shows an example of an example neural network in operation, in accordance with an example implementation of the present application;

DETAILED DESCRIPTION

Figure 1:
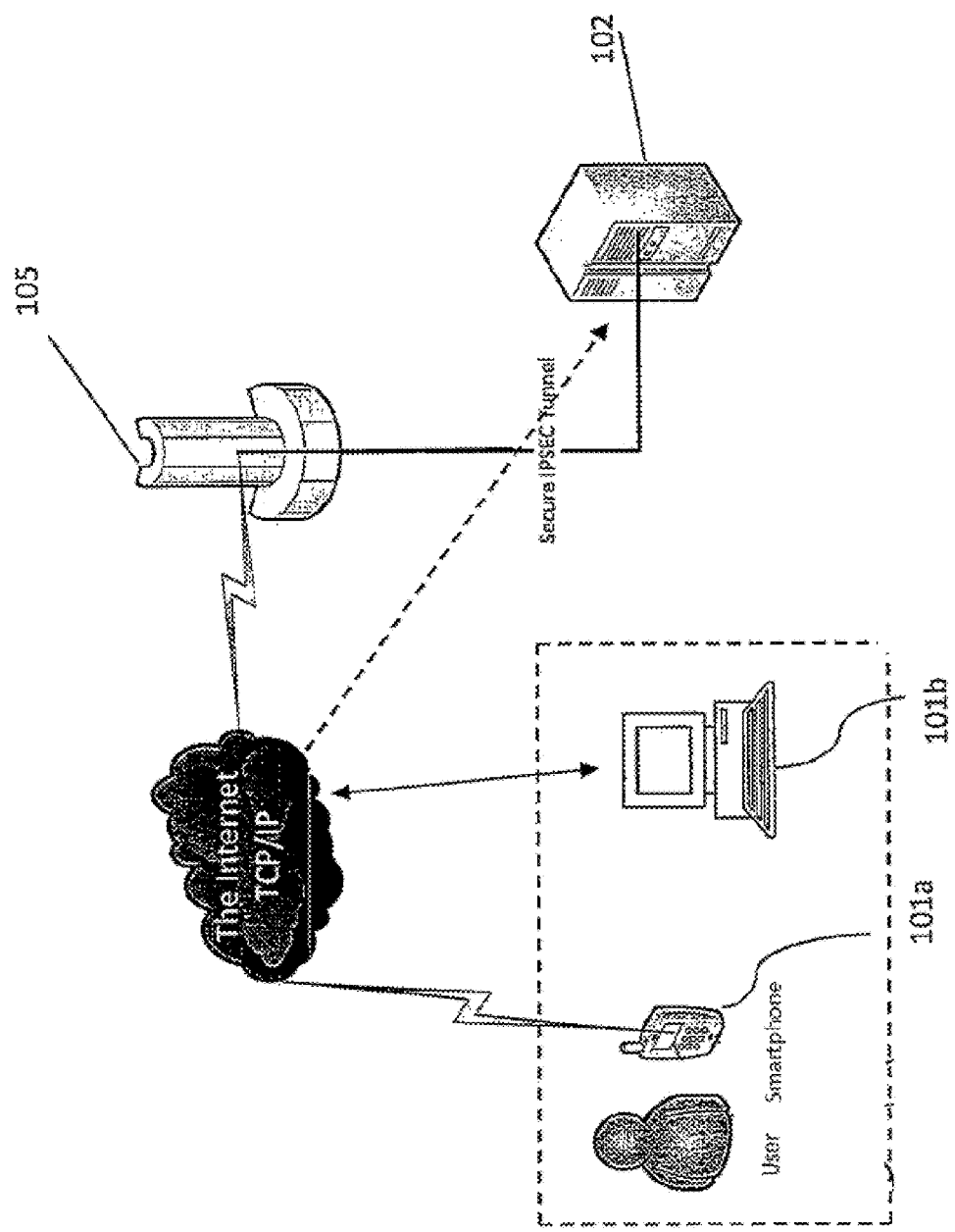
FIG. 1 illustrates a exemplary system for identifying a user in accordance with one or more embodiments.

Encryption remains a widely popular and effective way to protect information during transport of the information. The nature of the information often dictates the level and type of encryption used to protect the information, particularly to prevent compromise while the information is in transit. Unfortunately, it has not been possible or practical to encrypt all stored data at the application level, for example, due to a need to search the data. It has been infeasible, at least from a performance perspective, to search encrypted data effectively without requiring exhaustive search process that include decrypting the data, record by record.

Personally identifiable information ("PII"), in particular, requires encryption mechanisms and additional policies and processes for data protection, as various operations on the data demand decryption of such data for viewing and editing. For example, the Health Insurance Portability and Accountability Act ("HIPAA") requires encryption of data during transport and offers policies for the release and dissemination of that data. The policy for cryptographic strength is meant to protect against compromises of PII databases, such as in cases of theft. By performing operations such as search, without decryption, data need not be exposed to potential compromise. Biometric data require further protections by processes and policies that introduce additional mechanisms including more sophisticated encryption schemes, such as visual cryptography.

The present application includes features and functionality for providing encrypted searching, beyond one-to-one record matching, given a reference biometric and a new input record. Further, the present application provides new methods and systems for searching encrypted biometric data without requiring data decryption in storage media, such as in databases, file systems, or other persistence mechanisms.

In addition to a one-to-one implementation, one-to-many implementations are supported by the teachings herein, in which searching of encrypted biometric records can occur as a function of a newly received biometric record. In such case, an orthogonal group O(n) exhaustive search can be conducted, in which each record is decrypted and compared. In accordance with one or more implementations of the present application, an O(log n) solution is provided that does not require decryption, and supports locating a record without decryption. Referred to herein, generally, as an identity use case, a given biometric vector is provided as input, and a respective biometric can be searched to determine whether the biometric is in a database.

In one or more implementations, the present application provides a polynomial-based solution for identification in a large encrypted data store of biometrics, thereby providing a system and mechanism to protect privacy. Furthermore, a selection of an initial biometric with low entropy is made. Thereafter, a selection of a data structure provides an Order log(n) for a search. A selection of an algorithm for intermediate nodes is made thereafter, such that the biometric cannot be discovered or a hashing algorithm cannot be reversed into the original biometric. Thus, an implementation in accordance with the present application provides an end-to-end technique for a biometric to be used to provide identification across a database of thousands (or more) of subjects.

In one or more implementations, a neural network, which can include a convolutional neural network, is utilized for processing images and for determining a correct cost function, such as to represent the performance quality of the neural network. In one or more implementations, a neural network is utilized for processing other data, including audio content such as a recording or representation of a person's voice. Although many of the example implementations shown and described herein relate to processing one or more image files, one skilled in the art will recognize that present application is preferably biometric agnostic, and that any suitable biometric can be used in accordance with the teachings herein. Various types of neural networks are suitable for receiving various formats of information and generating a feature vector, such as a convolutional neural network, a recurrent neural network ("RNN"), or deep machine learning system.

one or more implementations, a neural network, which can include a convolutional neural network, is utilized for processing images and for determining a correct cost function, such as to represent the performance quality of the neural network. In one or more implementations, a neural network is utilized for processing other data, including audio content such as a recording or representation of a person's voice. Although many of the example implementations shown and described herein relate to processing one or more image files, one skilled in the art will recognize that present application is preferably biometric agnostic, and that any suitable biometric can be used in accordance with the teachings herein. Other types of neural networks are suitable for receiving various formats of information and generating a feature vector, such as a recurrent neural network ("RNN"), or deep machine learning.

An exemplary system for identifying a user is shown as a block diagram in FIG. 1, which can be configured to interface with a neural network (not shown). In an exemplary arrangement, a system server 105, a remote computing device 102 and user computing devices 101*a* and 101*b* can be included. The system server 105 can be practically any computing device and/or data processing apparatus capable of communicating with devices 101*a*, 101*b* and other remote computing devices 102, including to receive, transmit and store electronic information and process requests as further described herein. System server 105, remote computing device 102 and user devices 101a and 101b are intended to represent various forms of computers, such as laptop computers, desktop computers, computer workstations, personal digital assistants, servers, blade servers, mainframes, and other computers and/or networked or cloud based computing systems.

In one or more implementations, remote computing device 102 can be associated with an enterprise organization, for example, a financial institution, an insurance company, or any entity that maintains user enterprise accounts (also referred to as "transaction accounts"). Such enterprise organizations provide services to account holders and requires authentication of the user prior to granting access to the enterprise systems and services. By way of further example, remote computing device 102 can include payment networks and/or banking networks for processing financial transactions, as understood by those skilled in the art.

The user computing devices 101a, 101b can be any computing device and/or data processing apparatus capable of embodying the systems and/or methods described herein, including but not limited to a personal computer, tablet computer, personal digital assistant, mobile electronic device, cellular telephone or smart phone device and the like. The transaction terminal 101b is intended to represent various forms of computing devices, such as workstations, dedicated point-of-sale systems, ATM terminals, personal computers, laptop computers, tablet computers, smart phone devices, personal digital assistants or other appropriate computers that can be used to conduct electronic transactions. The devices 101a, 101b can also be configured to receive user inputs as well as capture and process biometric information, for example, digital images of a user, as further described herein.

In one or more implementations, the system server 105, implements rules governing access to information and/or the transmission of information between computing devices that users interact with (e.g., device 101a, 101b) and one or more trusted back end servers (e.g., remote computing device 102).

As further described herein, the systems and methods for identifying and/or authenticating a user can meet the security levels required by an enterprise system by using an API to integrate with an existing system (e.g., a financial institution's transaction processing and data management system). Accordingly, the system server 105 need not know whether the underlying system (e.g., remote computing device 102) is a Relational Database Management System (RDBMS), a Search Engine, a financial transaction processing system and the like. Accordingly, the systems and methods for facilitating secure authentication offer a "point and cut" mechanism to add the appropriate security to existing enterprise systems, as well as to systems in development. In some implementations, the system architecture is a language neutral allowing REST, JSON and Secure Socket Layers to provide the communication interface between the various computing devices (e.g., 101a, 101b, 102, and 105). Further, in one or more implementations, the architecture is built on the servlet specification, open secure socket layers, Java, JSON, REST and/or Apache Solr. Accordingly, the disclosed systems for authenticating a user can implement open standards, thereby allowing significant interoperability.

It should be further understood that while the various computing devices and machines referenced herein, including but not limited to user devices 101a and 101b, system server 105 and remote computing device 102 are referred to herein as individual/single devices and/or machines. In certain implementations the referenced devices and machines, and their associated and/or accompanying operations, features, and/or functionalities can be combined or arranged or otherwise employed across any number of devices and/or machines, such as over a network connection or wired connection, as is known to those of skill in the art.

Figure 2A:
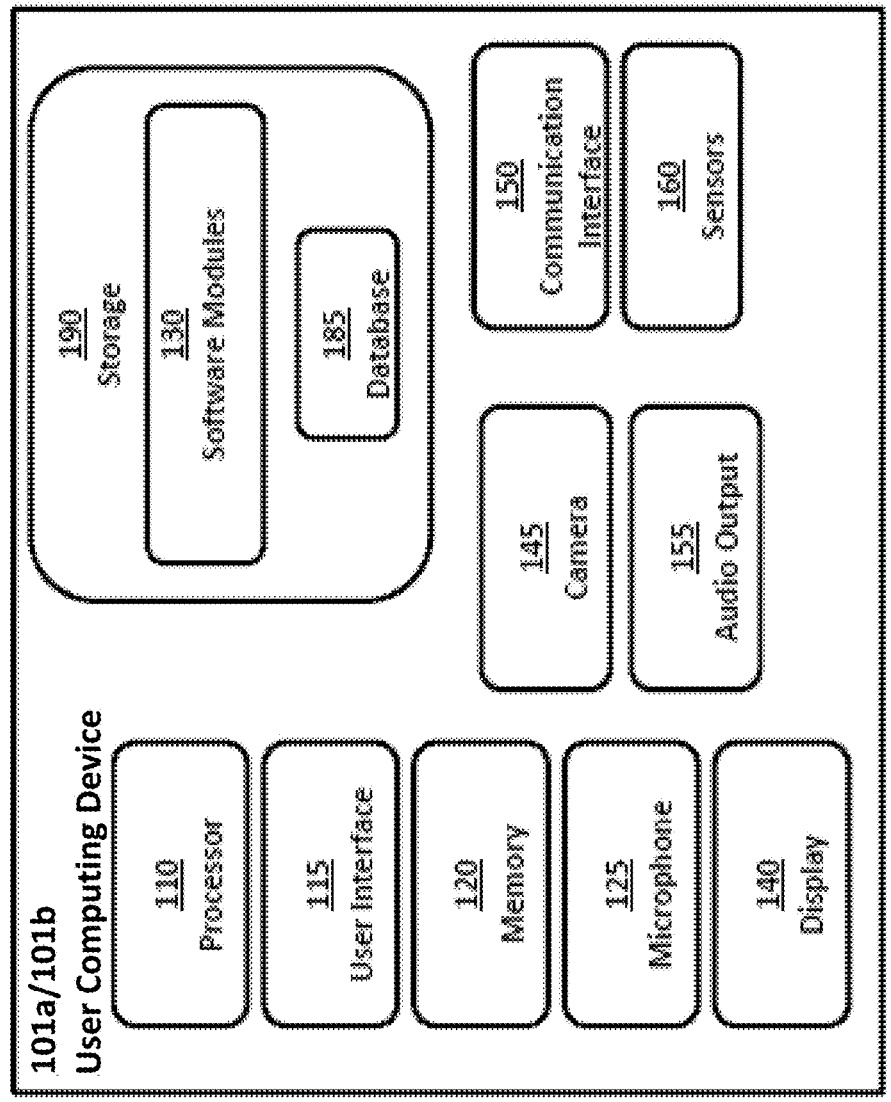
FIG. 2A is a block diagram illustrating components and features of an example user computing device, and includes various hardware and software components that serve to enable operation of the system.

FIG. 2A is a block diagram illustrating components and features of a user computing device 101a, and includes various hardware and software components that serve to enable operation of the system, including one or more processors 110, a memory 120, a microphone 125, a display 140, a camera 145, an audio output 155, a storage 190 and a communication interface 150. Processor 110 serves to execute a client application in the form of software instructions that can be loaded into memory 120. Processor 110 can be a number of processors, a central processing unit CPU, a graphics processing unit GPU, a multi-processor core, or any other type of processor, depending on the particular implementation.

Preferably, the memory 120 and/or the storage 190 are accessible by the processor 110, thereby enabling the processor to receive and execute instructions encoded in the memory and/or on the storage so as to cause the device and its various hardware components to carry out operations for aspects of the exemplary systems and methods disclosed herein. Memory can be, for example, a random access memory (RAM) or any other suitable volatile or non-volatile computer readable storage medium. The storage 190 can take various forms, depending on the particular implementation. For example, the storage can contain one or more components or devices such as a hard drive, a flash memory, a rewritable optical disk, a rewritable magnetic tape, or some combination of the above. In addition, the memory and/or storage can be fixed or removable.

Figure 2B:
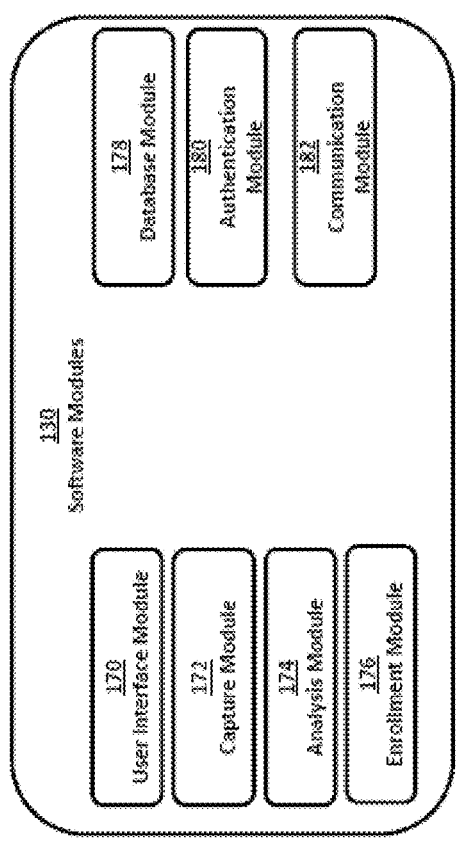
FIG. 2B illustrates a plurality of example modules, such as that are encoded in a storage and/or in the memory, in accordance with one or more embodiments.

One or more software modules 130 are encoded in the storage 190 and/or in the memory 120. The software modules 130 can comprise one or more software programs or applications having computer program code or a set of instructions executed in the processor 110. As depicted in FIG. 2B, one or more of a user interface module 170, a biometric capture module 172, an analysis module 174, an enrollment module 176, a database module 178, an authentication module 180 and a communication module 182 can be included among the software modules 130 that are executed by processor 110. Such computer program code or instructions configure the processor 110 to carry out operations of the systems and methods disclosed herein and can be written in any combination of one or more programming languages.

The program code can execute entirely on user computing device 101, as a stand-alone device, partly on user computing device 101, partly on system server 105, or entirely on system server 105 or another remote computer/device 102. In the latter scenario, the remote computer can be connected to user computing device 101 through any type of network, including a local area network (LAN) or a wide area network (WAN), mobile communications network, cellular network, or the connection can be made to an external computer (for example, through the Internet using an Internet Service Provider).

It can also be that the program code of software modules 130 and one or more computer readable storage devices (such as memory 120 and/or storage 190) form a computer program product that can be manufactured and/or distributed in accordance with the present invention, as is known to those of ordinary skill in the art.

It should be understood that in some illustrative embodiments, one or more of the software modules 130 can be downloaded over a network to storage 190 from another device or system via communication interface 150. In addition, it should be noted that other information and/or data relevant to the operation of the present systems and methods (such as database 185) can also be stored on storage. In some implementations, such information is stored on an encrypted data-store that is specifically allocated so as to securely store information collected or generated by the processor 110 executing the software modules 130. Preferably, encryption measures are used to store the information locally on the user computing device storage and transmit information to the system server 105. For example, such data can be encrypted using a 1024 bit polymorphic cipher, or, depending on the export controls, an AES 256 bit encryption method. Furthermore, encryption can be performed using remote key (seeds) or local keys (seeds). Alternative encryption methods can be used as would be understood by those skilled in the art, for example, SHA256.

In addition, data stored on the user computing device 101a and/or system server 105 can be encrypted using an encryption key generated from a user's biometric information, liveness information, or user computing device information as further described herein. In some implementations, a combination of the foregoing can be used to create a complex unique key for the user that can be encrypted on the user computing device using Elliptic Curve Cryptography, preferably at least 384 bits in length. In addition, that key can be used to secure the user data stored on the user computing device and/or the system server.

Also preferably stored on storage 190 is database 185. As will be described in greater detail below, the database contains and/or maintains various data items and elements that are utilized throughout the various operations of the system and method for authenticating a user conducting a financial transaction at a transaction terminal. The information stored in database 185 can include, but not limited to, a user profile, as will be described in greater detail herein. It should be noted that although database 185 is depicted as being configured locally to user computing device 101a, in certain implementations the database and/or various of the data elements stored therein can, in addition or alternatively, be located remotely (such as on a remote device 102 or system server 105—not shown) and connected to user computing device through a network in a manner known to those of ordinary skill in the art.

A user interface 115 is also operatively connected to the processor. The interface can be one or more input or output device(s) such as switch(es), button(s), key(s), a touch-screen, microphone, etc. as would be understood in the art of electronic computing devices. User interface 115 serves to facilitate the capture of commands from the user such as an on-off commands or user information and settings related to operation of the system for authenticating a user. For example, interface serves to facilitate the capture of certain information from the user computing device 101 such as personal user information for enrolling with the system so as to create a user profile.

The computing device 101a can also include a display 140 which is also operatively connected to processor the processor 110. The display includes a screen or any other such presentation device which enables the user computing device to instruct or otherwise provide feedback to the user regarding the operation of the system 100. By way of example, the display can be a digital display such as a dot matrix display or other 2-dimensional display.

By way of further example, the interface and the display can be integrated into a touch screen display. Accordingly, the display is also used to show a graphical user interface, which can display various data and provide "forms" that include fields that allow for the entry of information by the user. Touching the touch screen at locations corresponding to the display of a graphical user interface allows the user to interact with the device to enter data, change settings, control functions, etc. So, when the touch screen is touched, the user interface 115 communicates this change to the processor 110, and settings can be changed or user entered information can be captured and stored in the memory 120 and/or storage 190.

Devices 101a, 101b can also include a camera 145 capable of capturing digital images. The camera can be one or more imaging devices configured to capture images of at least a portion of the user's body, including, the user's eyes and/or face while utilizing the user computing device 101a. The camera serves to facilitate the capture of images of the user for the purpose of image analysis by the configured user computing device processor, which includes identifying biometric features for (biometrically) authenticating the user from the images. The user computing device 101a and/or the camera 145 can also include one or more light or signal emitters (not shown) for example, a visible light emitter and/or infra-red light emitter and the like. The camera can be integrated into the user computing device, such as a front-facing camera or rear facing camera that incorporates a sensor, for example and without limitation a CCD or CMOS sensor. Alternatively, the camera can be external to the user computing device 101a. The possible variations of the camera and light emitters would be understood by those skilled in the art. In addition, the user computing device can also include one or more microphones 125 for capturing audio recordings, as understood by those skilled in the art.

An audio output 155 can be also operatively connected to the processor 110. The audio output can be integrated into the user computing device 101 or external to the user computing device and can be any type of speaker system that is configured to play electronic audio files as would be understood by those skilled in the art.

Various hardware devices/sensors 160 can be operatively connected to the processor. The sensors 160 can include: an on-board clock to track time of day; a GPS enabled device to determine a location of the user computing device; an accelerometer to track the orientation and acceleration of the user computing device; a gravity magnetometer for measuring the earth's magnetic field, proximity sensors for measuring distance from the user computing device to an object, RF radiation sensors for measuring radiation and other such devices for capturing information concerning the environment of the user computing device, as would be understood by those skilled in the art.

Communication interface 150 is also operatively connected to the processor 110 and can be any interface that enables communication between the user computing device 101a and external devices, machines and/or elements. Preferably, the communication interface can include but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the user computing device to other computing devices and/or communication networks such as private networks and the Internet. Such connections can include a wired connection or a wireless connection (e.g., using the 802.11 standard) though it should be understood that the communication interface can be practically any interface that enables communication to/from the user computing device.

Figure 2C:
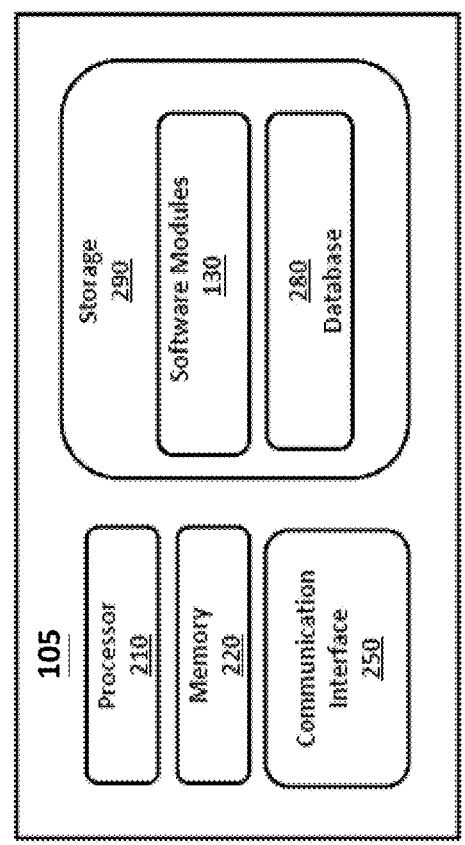
FIG. 2C is a block diagram illustrating an exemplary configuration of a system server.

FIG. 2C is a block diagram illustrating an exemplary configuration of system server 105. System server 105 can include a processor 210 which is operatively connected to various hardware and software components that serve to enable operation of the system for, for example, authenticating a user in connection with a transaction at a transaction terminal. The processor 210 serves to execute instructions to perform various operations, including relating to user authentication and transaction processing/authorization. The processor 210 can be a number of processors, a multi-processor core, or some other type of processor, depending on the particular implementation.

In certain implementations, a memory 220 and/or a storage medium 290 are accessible by the processor 210, thereby enabling the processor 210 to receive and execute instructions stored on the memory 220 and/or on the storage 290. The memory 220 can be, for example, a random access memory (RAM) or any other suitable volatile or non-volatile computer readable storage medium. In addition, the memory 220 can be fixed or removable. The storage 290 can take various forms, depending on the particular implementation. For example, the storage 290 can contain one or more components or devices such as a hard drive, a flash memory, a rewritable optical disk, a rewritable magnetic tape, or some combination of the above. The storage 290 also can be fixed or removable.

One or more software modules 130 (depicted in FIG. 2B) can be encoded in the storage 290 and/or in the memory 220. The software modules 130 can comprise one or more software programs or applications (collectively referred to as the "secure authentication server application") having computer program code or a set of instructions executed in the processor 210. Such computer program code or instructions for carrying out operations for aspects of the systems and methods disclosed herein can be written in any combination of one or more programming languages, as would be understood by those skilled in the art. The program code can execute entirely on the system server 105 as a stand-alone software package, partly on the system server 105 and partly on a remote computing device, such as a remote computing device 102, user computing device 101a and/or user computing device 101b, or entirely on such remote computing devices.'

Also preferably stored on the storage 290 is a database 280. As will be described in greater detail below, the database 280 contains and/or maintains various data items and elements that are utilized throughout the various operations of the system 100, including but not limited to, user profiles as will be described in greater detail herein. It should be noted that although the database 280 is depicted as being configured locally to the computing device 105, in certain implementations the database 280 and/or various of the data elements stored therein can be stored on a computer readable memory or storage medium that is located remotely and connected to the system server 105 through a network (not shown), in a manner known to those of ordinary skill in the art.

A communication interface 250 is also operatively connected to the processor 210. The communication interface can be any interface that enables communication between the system server 105 and external devices, machines and/or elements. In certain implementations, the communication interface can include but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the computing device 105 to other computing devices and/or communication networks, such as private networks and the Internet. Such connections can include a wired connection or a wireless connection (e.g., using the 802.11 standard) though it should be understood that communication interface 255 can be practically any interface that enables communication to/from the processor 210.

Figure 3:
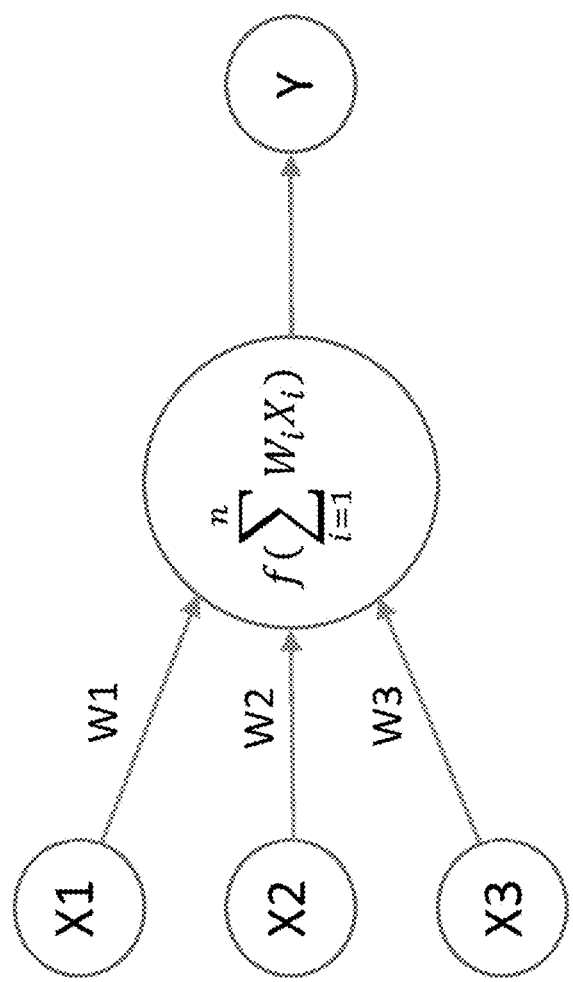
FIG. 3 is a system diagram illustrating various aspects of the health monitoring and tracking system in accordance with one or more embodiments.
Figure 4A:
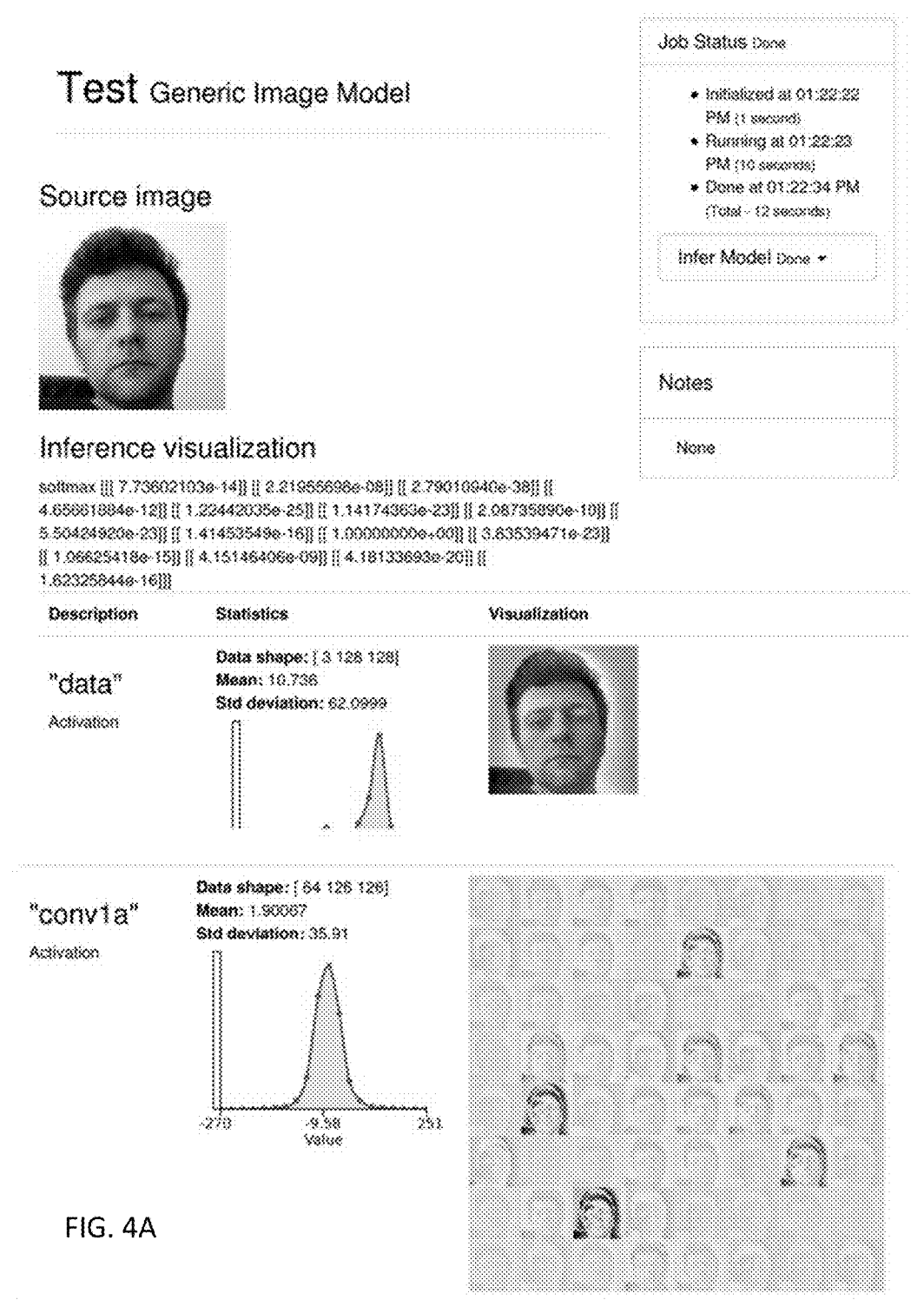
Figure 4B:
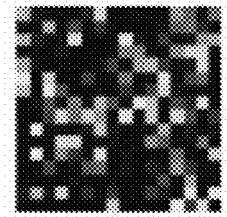
Figure 4B:
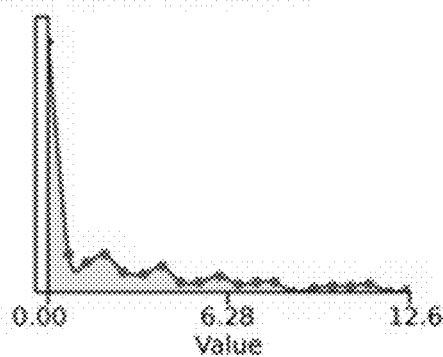
Figure 4B:
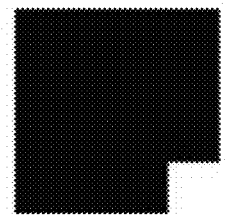
Figure 4B:
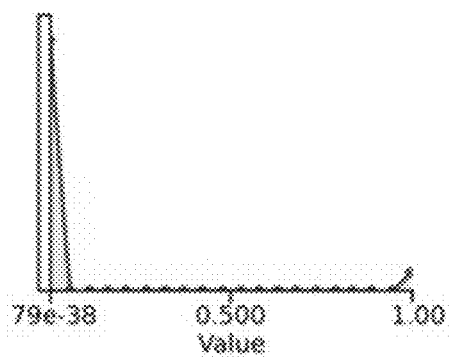

The operation of the system for authenticating a user and the various elements and components described above will be further appreciated with reference to FIGS. 3-4B and with continued reference to FIGS. 1 and 2A-2B. The processes depicted in FIGS. 3 and 4 are shown from the perspective of the user computing device 101a as well as the system server 105, however, it should be understood that the processes can be performed, in whole or in part, by the user computing device 101a, the system server 105 and/or other computing devices (e.g., remote computing device 102) or any combination thereof.

FIG. 3 is a simple diagram that illustrates a series of nodes X1, X2 and X3 in a neural network, and further illustrates an activation function as a summation of a matrix of weights times the X values, and which yields a Y value. An objective is to find the ideal number of neurons and layers in the neural network. A formula for calculating the number of neurons that "fit" in a given volume is given by $(W-K+2P)/S+1$. For example, the cost function is Euclidean and the number of layers given as the spatial size of the output volume can be computed as a function of the input volume size W, the kernel field size of the Cony Layer neurons K, the stride with which they are applied S, and the amount of zero padding P used on the border.

For example, the neural network is initially trained as a classifier using labeled biometric data. As part of the training process, each person is stored and images, from the training, are present. After an initial biometric vector ("IBV") is introduced into the neural network, the vector used in the n−1 layer can be used as a unique feature vector to identify that initial biometric vector, albeit in the homomorphic encrypted space. This feature vector is Euclidean-measurable and encrypted. Moreover, the feature vector replaces the biometric vector. In one or more implementations, the feature vector is a list of 256 floating-point numbers, and the biometric is reconstructed from the list of 256 floating-point numbers. The feature vector is, accordingly, a one-way encryption. Feature vectors have the property of being Euclidean-measurable.

It is recognized that the present application provides applicability in a variety of vertical markets that may require an encrypted search for identification using biometric inputs. For example, insurance companies and banks have a desire for mechanisms to identify an account holder who has lost his/her account number. The solution provided in accordance with the present application can run in $O(\log(n))$ time, which is believed to improve upon existing $O(n)$ algorithms for the encrypted search over a database of encrypted biometric records.

In one or more implementations, for example, a mathematical transform is employed for providing a partitioning for a linear search. In such case, this transform takes a biometric vector and returns a feature vector. The feature vector is usable, thereafter, for direct access to a node. The accessed node can then be linearly scanned to determine a respective identity. For example, an individual user can be identified as a function of the node that is accessed as a function of the feature vector.

In one or more implementations, a mathematical function can be employed that partitions information (e.g., vectors) associated with biometrics for supporting a tree structure such as a B+ tree. Alternatively, or in addition, information associated with biometrics (e.g., biometric vectors) can be placed through a neural network, which is operable to create a non-reversible biometric for matching or proximity.

In connection with an implementation that employs a neural network, a Euclidian distance algorithm functions to convert a facial biometric vector or other value into something that can be compared. An initial biometric value (template) is processed through the neural network and results in a feature vector. Such an implementation is useful, for example, in connection with a "one to one" use case or with a one-to-many case. In either case, the neural network and feature vector are usable to perform the comparison in the encrypted space. In addition and post a one-to-one case, a neural network can operate to perform a Euclidian cost to access a specific biometric or one or more groups of biometrics, after applying multiple levels of the neural network. The resulting vector, following matrix multiplications for each respective layer, can use a Euclidean distance algorithm, based on the Euclidean cost function, and is referred to herein, generally, as a feature vector.

The computing system can include clients and servers. A client and server are generally remote from each other and typically interact through a communication network. The relationship of client and server arises by virtue of computer programs running on the respective computers and having a client-server relationship to each other.

FIGS. 4A and 4B shows an example of an example neural network in operation, in accordance with an example implementation of the present application. The initial image is applied to the neural network. The resulting softmax is provided, which shows which of the defined "buckets" the image belongs. In the respective bucket shown, the images for the given individual are provided. For example, the feature vector for person X, as 256 values, when applied to the classifying function results in a floating-point number of Y. For all values near Y, the individual can be identified, provided that the feature vector is Euclidean-measurable and classifying function is stable.

Continuing with reference to FIGS. 4A and 4B, a resulting softmax function shows an image of the subject person in the training set. Thereafter, matrix computations for creating the softmax are shown. Two convolutional steps prior to the softmax is fc7-conv, which has the output from convolutional layer 7. The output is the feature vector.

Figure 5:
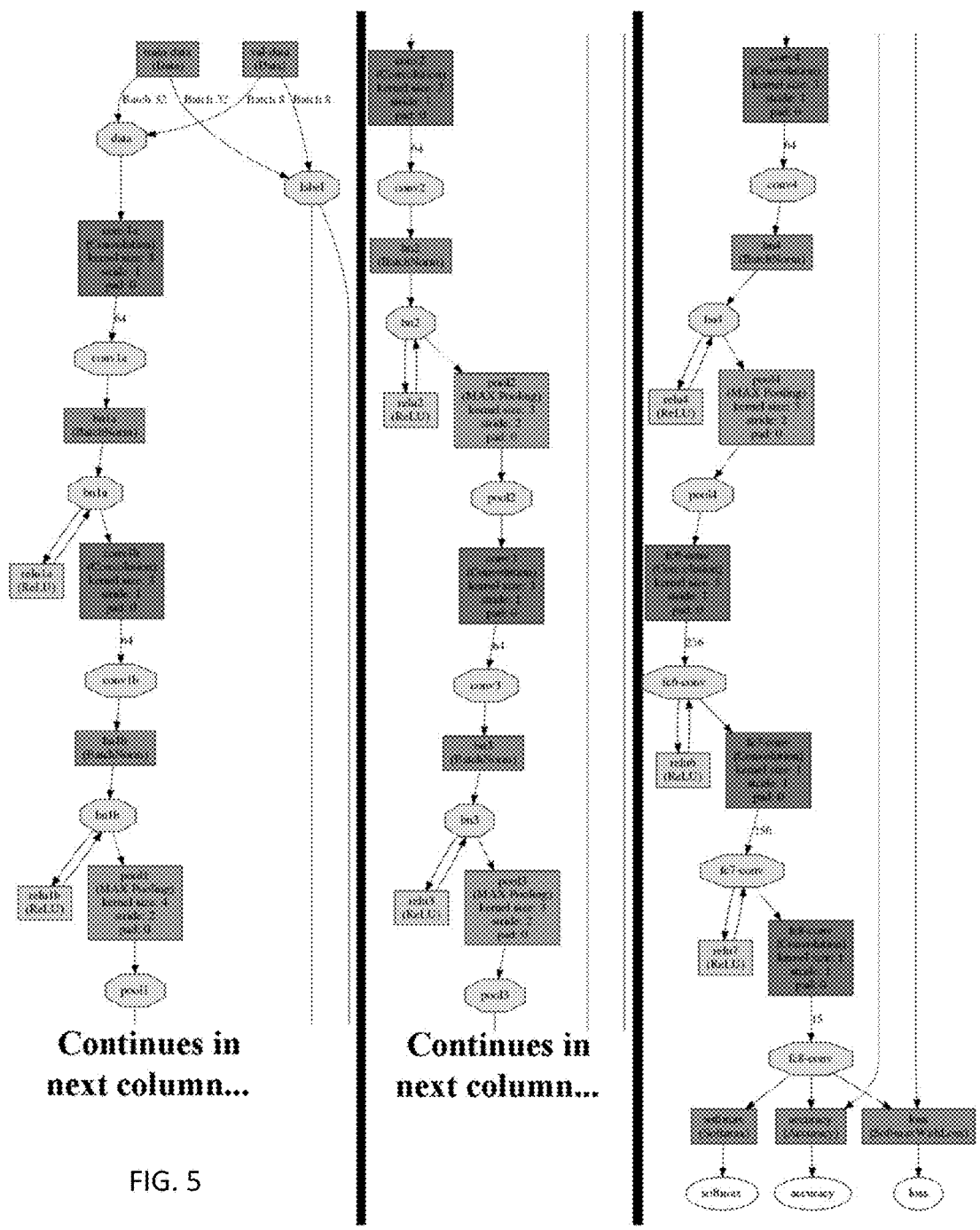
FIG. 5 illustrates an example process in accordance with the neural network.

FIG. 5 illustrates an example process in accordance with the neural network. A variety of convolutional layers are provided, together with a rectifier (ReLU) and pooling nodes. In the example shown in FIG. 5, the rectifier is a suitable activation function for deep neural networks, and is an activation function defined as f(x)=max(0,x).

Beyond ReLU, the neural network of the present application can be configured to use pooling as a form of non-linear down-sampling. More particularly, a type of pooling algorithm, referred to herein generally as maxpooling, partitions input images into a set of non-overlapping rectangles and, for each such sub-region, outputs the maximum. Once a feature has been found, its exact location may be less important than its relation to other features. The function of the pooling layer progressively reduces the spatial size of the representation to reduce the amount of parameters and computation in the network. Thus, through the use of convolutions, ReLU and maxpooling, a reasonable size vector of 256 is provided for use in matching, classifying and comparison. Furthermore, the resultant encrypted, Euclidean-measurable feature vectors (EMFVs) from the neural network can later be used in a classification algorithm to receive a scalar value that can be compared to the feature vectors from other biometrics. In one or more implementations, the present application utilizes pre-trained models, such as deep learning models trained on data associated with images of faces.

Continuing with reference to FIG. 5, the feature vector is an index for use for storage. For indexing, a classification algorithm is employed that, given an input feature vector, returns a floating-point number, which is usable as an index for storage. The classification algorithm has a dependence on a high-quality mean vector, which aids in creating distances between persons. The classification algorithm allows for searching and finding an enrolled person in polynomial time.

The aforementioned floating-point number allows for an index search for a previously stored biometric. Further, the present application employs a classification algorithm to provide the intended person based on the input feature vector.

In one or more implementations, an algorithm is utilized in which data and matrices are stored to provide a learned model. In such case, an average face vector is compared to a respective IBV, and differences between the average face vector and the IBV are computed. For example, a Frobenius algorithm can be utilized in which an absolute distance is computed between each floating point and its average. Moreover the relative position difference between the average face vector and the respective IBV is computed and, thereafter, squared. All of the values are, thereafter, summed and the square root is calculated. This results in values that are relatively close, i.e., all of the calculated Frobenius distances are relatively close clusters.

In one or more implementations, during enrollment a number of facial vectors (0-12) are obtained. The vectors are processed through the neural network and if any of the processed feature vectors have a value of 0, then the value is degraded to (approach 0, or get 0), as the value is not significant because it's not present in every feature vector.

In operation, each time an image is used, it is degraded, which provides for more separation within the feature vectors. Given a feature vector of 256 nonnegative integers, the procedure described herein classifies the vector into an appropriate pool, and each pool is for one and only one distinct person. If the person is not found, it is assumed the algorithm will look for neighboring persons to complete the search.

Thus, the present application uses the Euclidean distance to classify unknown vectors of the form $x=(x_0, x_1, \ldots, x_{255})$. Unless otherwise noted, $x_i$ is a nonnegative integer for all $i \in \{0, 1, \ldots, 255\}$. The distance between two vectors is defined as $d(x, y)=(\Sigma_{i=0}^{255}|x_i-y_i|^2)^{1/2}$. Given a vector x, let $\hat{x}=x/d(x, (0, 0, \ldots, 0))$.

In operation, U is defined as the set of known vectors and |U| the number of vectors in U. |U| is assumed $\infty$. Then the mean of all vectors in U is given by $m_U=1/|U|\Sigma_{x \in U} x$ and can be calculated explicitly if |U| is sufficiently small. If |U| is not sufficiently small, then $m_U$ can be approximated. Note that the coordinates of $m_U$ are not necessarily nonnegative integers.

Now, consider a partition of U as $U=\sqcup_j P_j$. We have observed experimentally that for each $P_j$, there exist $a_j$, $b_j$ $\in (0, \infty)$ such that $d(\overline{m_U}, \hat{y}) \in [a_j, b_j]$ for all $y \in P_j$. Moreover, $[a_j, b_j]$ is disjoint from $[a_k, b_k]$ for $j \neq k$. In other words, bands of distances from the mean vector can be used to classify unknown vectors.

Given a vector $y \notin U$, $d(\overline{m_U}, \hat{y})$ is calculated to determine how to uniquely extend partitions of U to partitions of $V = U \cup \{y\}$. If $d(\overline{m_U}, \hat{y}) \notin [a_j, b_j]$ for all j, then the interval $[a_j, b_j]$ closest to y is chosen and the subset $P_j$ associated with this interval is chosen to include y in the extension of the original partition to a partition of V. If it happens that y is equidistant to two different intervals, then the subset in which to include y in the partition of V is not well-defined. In this case, the numerical results should be re-examined and a better choice for at least one of the two intervals equidistant to y should be made.

In an example operation, 257 images are used for training. In the example training operation, the neural network is a 32 node, 8 convolution layer network. The training allocates the appropriate weights to the network. With this trained network, a new face was applied for either storage or lookup. In either case, the face was put through the neural network and at convolutional layer 7, a feature vector was received.

Using a set of images, and applying our neural network the following EMFV was received at convolutional layer 7. An example of one such output is below:

```
3 0 0 0 7 12 4 0 2 2 0 0 0 2 0 2 0 0 1 0 1 3 4 7 0 4 1 4 8 2 0

2 6 0 8 7 5 0 0 0 4 7 0 3 2 0 1 2 3 4 0 0 0 0 0 0 2 0 0 2 1 6

3 0 2 1 1 0 0 4 0 8 3 5 0 5 3 1 4 0 9 0 3 1 6 1 0 2 8 1 0 2 0

2 2 3 1 0 4 2 0 2 5 2 1 0 2 2 0 0 1 0 1 3 2 1 1 0 1 9 5 5 3 0

1 0 4 0 0 4 2 1 5 4 1 0 5 1 3 1 5 8 1 7 4 7 0 0 2 4 1 4 4 0 3

0 0 4 0 9 4 0 0 3 1 1 4 0 5 0 1 2 1 6 7 0 5 5 0 4 6 0 2 3 7 0

0 4 1 3 0 3 0 0 6 1 0 1 0 0 1 0 0 7 3 0 5 0 0 0 3 0 1 0 2 3 0

0 1 11 0 6 0 1 8 1 0 1 1 0 0 0 0 3 9 2 0 7 2 5 0 0 0 1 0 0 3 5

3 0 0 0 5 3 4 2
```

The feature vector classifies to a specific person within runtime O(1). Using the algorithm described herein, ranges of three individuals were determined. Using normalized vectors, the resulting ranges of images are as follows. For Person 1, the normalized distances range from 0.85 to 1.12. For Person 2 the range is from 1.18 to 1.32. For Person 3, the normalized distances range from 0.39 to 0.68.

As a practical example, subsequent IBVs of Person 1, when given to the neural network and classification algorithm, produces results between 0.85 and 1.12. Similarly, subsequent IBVs for Person 3 yields results between 0.39 and 0.68. These acceptable ranges offer banding for each respective person. Therefore, the idea is that banding and no collisions are observed for the bands between persons. For small sets of data, the results are exact.

Thus, the present application provides technology for: (1) acquiring a biometric, (2) plaintext biometric matching, (3) encrypting the biometric, (4) performing a Euclidean-measurable match, and (5) searching using a one-to-many indexing scheme. These are provided in a privacy-protected and polynomial-time based way that is also biometric-agnostic and performed as a function of machine learning. The present application provides a general-purpose solution that produces biometric ciphertext that is Euclidean-measurable, including as a function of convolutional neural network. This is further provided as a function of a classification algorithm is employed for one-to-many identification, which maximizes privacy and runs between O(1) and O(log(n)) time.

An Initial Biometric Vector (IBV) is received, and one or more modules apply a neural network to the IBV. The IBV is processed, either on the user computing device or on a server, through a set of matrix operations, to create a feature vector. Either part or the entire feature vector, may be stored on the client or the server. Following matrix multiplication across several layers, the IBV is returned as a Euclidean Measureable vector. In one or more implementations, the same action can occur with the Current Biometric Vector (CBV) and the two vectors are matched.

Figure 6:
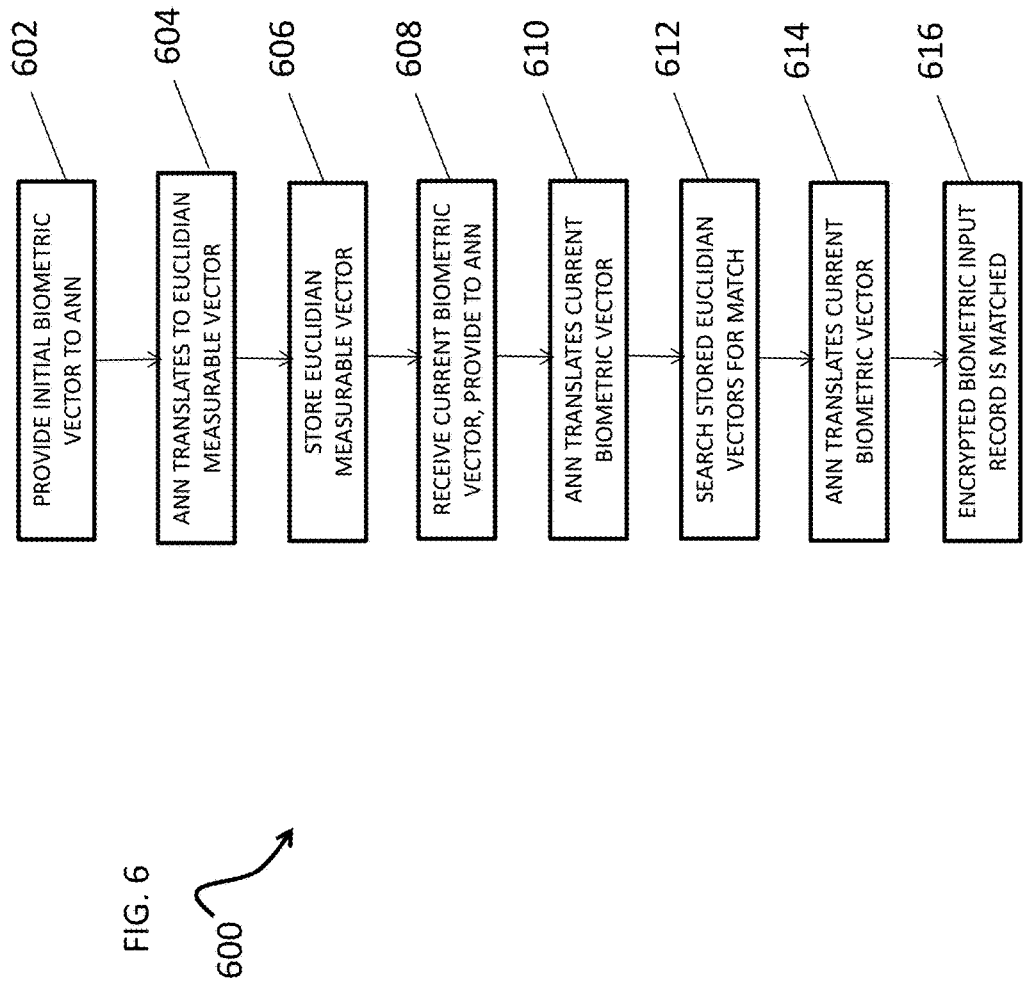
FIG. 6 is a flowchart illustrating example process steps in accordance with an implementation.

FIG. 6 is a flowchart illustrating example process steps 600 in accordance with an implementation. It should be appreciated that several of the logical operations described herein are implemented (1) as a sequence of computer implemented acts or program modules running on a communication device and/or (2) as interconnected machine logic circuits or circuit modules within a communication device. The implementation is a matter of choice dependent on the requirements of the device (e.g., size, energy, consumption, performance, etc.). Accordingly, the logical operations described herein are referred to variously as operations, structural devices, acts, or modules. Various of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein. The example steps 600 illustrated FIG. 6 provide for a computer implemented method for matching an encrypted biometric input record with at least one stored encrypted biometric record, and without data decryption of the input and the at least one stored record.

The process begins at step 602, and an initial biometric vector is provided to a neural network, and the neural network translates the initial biometric vector to a Euclidian measurable feature vector (step 604). The Euclidean measurable feature vector is stored in a storage with other Euclidean measurable feature vectors (step 606). Moreover, a current biometric vector representing the encrypted biometric input record is received from a mobile computing device over a data communication network, and the current biometric vector is provided to the neural network (step 608). The neural network translates the current biometric vector to a current Euclidian measurable feature vector (step 610). Furthermore, a search of at least some of the stored Euclidian measurable feature vectors is performed in a portion of the data storage using the current Euclidian measurable feature vector (step 614). The encrypted biometric input record is matched with at least one encrypted biometric record in encrypted space as a function of an absolute distance computed between the current Euclidian measurable feature vector and a calculation of each of the respective Euclidian measurable feature vectors in the portion of the storage (step 616).

The subject matter described above is provided by way of illustration only and should not be construed as limiting. Various modifications and changes can be made to the subject matter described herein without following the example embodiments and applications illustrated and described, and without departing from the true spirit and scope of the present invention, including as set forth in each and any of the following claims.

What is claimed:

1. A computer implemented method for matching an encrypted biometric input record with at least one stored encrypted biometric record, without data decryption of the input and the at least one stored record, the method comprising:
   providing an initial biometric vector to a neural network, wherein the neural network translates the initial biometric vector to a Euclidian measurable feature vector;
   storing the Euclidian measurable feature vector in a storage with other Euclidian measurable feature vectors;
   classifying the Euclidian measurable feature vector; and/or classifying the current Euclidian measurable feature vector, wherein the classifying is performed at least in part using one or more distance functions;
   receiving, from a mobile computing device over a data communication network, a current biometric vector representing the encrypted biometric input record;
   providing the current biometric vector to the neural network, wherein the neural network translates the current biometric vector to a current Euclidian measurable feature vector; and
   conducting a search of at least some of the stored Euclidian measurable feature vectors in a portion of the data storage using the current Euclidian measurable feature vector,
   wherein the encrypted biometric input record is matched with at least one encrypted biometric record in encrypted space as a function of an absolute distance computed between the current Euclidian measurable feature vector and a calculation of each of the respective Euclidian measurable feature vectors in the portion of the storage,
   wherein classifying the Euclidian measurable feature and/or the current Euclidian measurable feature vector returns floating point values, and a Frobenius algorithm is utilized to compute an absolute distance between each floating point and its average.

2. The method of claim 1, wherein the search is conducted in Order log(n) time.

3. The method of claim 1, further comprising:
   using a Frobenius algorithm to classify the Euclidian measurable biometric vectors;
   traversing a hierarchy of the classified Euclidian measurable biometric vectors in Order log(n) time; and
   identifying that a respective Euclidian measurable biometric vector is the current Euclidian measurable feature vector.

4. The method of claim 1, further comprising:
   identifying, for each respective Euclidian measurable biometric vector, a plurality of floating point values; and
   using a bitmap to eliminate from an absolute distances calculation any of the plurality of values that are not present in every vector.

5. The method of claim 1, further comprising:
   identifying, for each respective Euclidian measurable biometric vector, a plurality of floating point values; and
   defining a sliding scale of importance based on the number of vectors a respective one of the floating point value appears.

6. The method of claim 1, wherein the neural network is configured with a variety of convolutional layers, together with a rectifier (ReLU) and pooling nodes.

7. The method of claim 6, further comprising:
   computing, for each of a plurality of stored Euclidian measurable feature vectors, a relative position difference between an average face vector and the respective Euclidian measurable feature vector;
   squaring the relative position difference;
   summing the values; and
   calculating the square root.

8. The method of claim 1, wherein the neural network is configured to use pooling as a form of non-linear down-sampling,
   and further wherein one or more pooling nodes progressively reduce the spatial size of a represented Euclidean-measurable feature vector to reduce the amount of parameters and computation in the neural network.

9. The method of claim 1, wherein performance of the neural network is determined as a function of a cost function, in which a number of layers given as a spatial size of an output volume is computed as a function of an input volume size W, a kernel field size of layer neurons K, a stride with which the layers are applied S, and an amount of zero padding P used on a border.

10. The method of claim 1, wherein the neural network translates the initial biometric vector and the current biometric vector as a function of matrix multiplications for each respective layer, and uses a Euclidean distance algorithm based on a Euclidean cost function.

11. A computer implemented system for matching an encrypted biometric input record with at least one stored encrypted biometric record, without data decryption of the input and the at least one stored record, the system comprising:
   one or more processors and a computer-readable medium, wherein the one or more processors are configured to interact with the computer-readable medium in order to perform operations that include:
   providing an initial biometric vector to a neural network, wherein the neural network translates the initial biometric vector to a Euclidian measurable feature vector;
   storing the Euclidian measurable feature vector in a storage with other Euclidian measurable feature vectors;
   receiving, from a mobile computing device over a data communication network, a current biometric vector representing the encrypted biometric input record;
   classifying the Euclidian measurable feature vector; and/or classifying the current Euclidian measurable feature vector, wherein the classifying is performed at least in part using one or more distance functions;

providing the current biometric vector to the neural network, wherein the neural network translates the current biometric vector to a current Euclidian measurable feature vector; and conducting a search of at least some of the stored Euclidian measurable feature vectors in a portion of the data storage using the current Euclidian measurable feature vector, wherein the encrypted biometric input record is matched with at least one encrypted biometric record in encrypted space as a function of an absolute distance computed between the current Euclidian measurable feature vector and a calculation of each of the respective Euclidian measurable feature vectors in the portion of the storage, wherein classifying the Euclidian measurable feature and/or the current Euclidian measurable feature vector returns floating point values, and a Frobenius algorithm is utilized to compute an absolute distance between each floating point and its average.

12. The system of claim 11, wherein the search is conducted in Order log(n) time.

13. The system of claim 11, wherein the one or more processors are configured to interact with the computer-readable medium in order to perform operations that include:
using a Frobenius algorithm to classify the Euclidian measurable biometric vectors;
traversing a hierarchy of the classified Euclidian measurable biometric vectors in Order log(n) time; and
identifying that a respective Euclidian measurable biometric vector is the current Euclidian measurable feature vector.

14. The system of claim 11, wherein the one or more processors are configured to interact with the computer-readable medium in order to perform operations that include:
identifying, for each respective Euclidian measurable biometric vector, a plurality of floating point values; and
using a bitmap to eliminate from an absolute distances calculation any of the plurality of values that are not present in every vector.

15. The system of claim 11, wherein the one or more processors are configured to interact with the computer-readable medium in order to perform operations that include:
identifying, for each respective Euclidian measurable biometric vector, a plurality of floating point values; and
defining a sliding scale of importance based on the number of vectors a respective one of the floating point value appears.

16. The system of claim 11, wherein the neural network is configured with a variety of convolutional layers, together with a rectifier (ReLU) and pooling nodes.

17. The system of claim 16, wherein the one or more processors are configured to interact with the computer-readable medium in order to perform operations that include:
computing, for each of a plurality of stored Euclidian measurable feature vectors, a relative position difference between an average face vector and the respective Euclidian measurable feature vector;
squaring the relative position difference;
summing the values; and
calculating the square root.

18. The system of claim 11, wherein the neural network is configured to use pooling as a form of non-linear down-sampling,
and further wherein one or more pooling nodes progressively reduce the spatial size of a represented Euclidean-measurable feature vector to reduce the amount of parameters and computation in the neural network.

19. The system of claim 11, wherein performance of the neural network is determined as a function of a cost function, in which a number of layers given as a spatial size of an output volume is computed as a function of an input volume size W, a kernel field size of layer neurons K, a stride with which the layers are applied S, and an amount of zero padding P used on a border.

20. The system of claim 11, wherein the neural network translates the initial biometric vector and the current biometric vector as a function of matrix multiplications for each respective layer, and uses a Euclidean distance algorithm based on a Euclidean cost function.

* * * * *